(12) United States Patent
AbdelAziz et al.

(10) Patent No.: US 7,486,695 B1
(45) Date of Patent: Feb. 3, 2009

(54) METHOD AND APPARATUS FOR DATA COMMUNICATION TUNNELING CHANNELS

(75) Inventors: Mohamed M. AbdelAziz, Santa Clara, CA (US); Juan Carlos Soto, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 839 days.

(21) Appl. No.: 10/951,931

(22) Filed: Sep. 28, 2004

Related U.S. Application Data

(60) Provisional application No. 60/531,783, filed on Dec. 22, 2003.

(51) Int. Cl.
*H04J 3/16* (2006.01)

(52) U.S. Cl. .............. 370/466; 370/401; 370/338; 709/230; 709/217; 709/224; 709/227

(58) Field of Classification Search .......... 709/227, 709/205, 217, 224, 230; 370/465, 466, 401, 370/338, 254
See application file for complete search history.

(56) References Cited

U.S. PATENT DOCUMENTS

| | | | |
|---|---|---|---|
| 5,920,699 A | 7/1999 | Bare | |
| 6,618,764 B1 * | 9/2003 | Shteyn | 709/249 |
| 2002/0116593 A1 | 8/2002 | Kazar et al. | |
| 2002/0143944 A1 * | 10/2002 | Traversat et al. | 709/225 |
| 2003/0033517 A1 * | 2/2003 | Rutherglen et al. | 713/153 |
| 2003/0217122 A1 | 11/2003 | Roese et al. | |
| 2005/0097087 A1 * | 5/2005 | Punaganti Venkata et al. | 707/3 |

OTHER PUBLICATIONS

Li Gong, Project JXTA: A Technology Overview, Sun Microsystems, Inc., Palo Alto California, Apr. 25, 2001.
Sun Microsystems, Inc., Project JXTA: An Open, Innovative Collaboration, Apr. 25, 2001.
Erik Guttman, Autoconfiguration for IP Networking: Enabling Local Communication, Sun Microsystems, Inc., Germany, May-Jun. 2001.
Health Johns, Understanding Zeroconf and Multicast DNS, Wireless Devcenter, Dec. 12, 2002.
U.S. Appl. No. 10/974,246, filed Oct. 27, 2004.

* cited by examiner

*Primary Examiner*—Ricky Ngo
*Assistant Examiner*—Kibrom T Hailu
(74) *Attorney, Agent, or Firm*—Robert C. Kowert; Meyertons, Hood, Kivlin, Kowert & Goetzel, P.C.

(57) ABSTRACT

Method and apparatus for multiplexed data communication tunneling channels. Embodiments of the tunneling mechanism may provide tunnel sockets between networking environments that allow a node in one networking environment to interconnect with network resources in other networking environments. A tunnel socket is a proxy or bridge across a peer-to-peer network between different networking environments. Using the tunneling mechanism, descriptions of network resources in one format may be translated to advertisements in a uniform description format, which may then be published on the network. The published advertisements may be discovered by entities in other networking environments and translated into formats of the other networking environments for access by the entities. To the entities, the resources appear to be in their local networking environment.

58 Claims, 7 Drawing Sheets

```
<SvrAdvertisement>
   <Name> Device Name </Name>
   <ID>uuid:....</ID>
   <Description> (description) </Description>
   <PipeID>xxxx:uuid....</PipeID>
   <Type> (type) </Type>
   <Latitude> 0.0 </Latitude>
   ...
</SvrAdvertisement>
```

METHOD AND APPARATUS FOR DATA COMMUNICATION TUNNELING CHANNELS

PRIORITY INFORMATION

This application claims benefit of priority of provisional application Ser. No. 60/531,783 entitled "Mechanism for Device and Service Description, Transformation, Discovery, and Connectivity in a Peer-to-Peer Network Environment" filed Dec. 22, 2003, whose inventors are Mohamed M. AbdelAziz and Juan C. Soto.

BACKGROUND OF THE INVENTION

1. Field of the Invention

This invention relates to peer-to-peer networking, and more particularly to interconnecting nodes and resources across networking environments in a peer-to-peer network.

2. Description of the Related Art

Peer-to-Peer Networking

The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. In addition to improving the performance of information discovery, content delivery, and information processing, such a style also can enhance the overall reliability and fault-tolerance of computing systems.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

JXTA

Sun Microsystems' JXTA™ is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

Service Location Protocol (SLP)

The Service Location Protocol (SLP) is a protocol or method of organizing and locating the resources (such as printers, disk drives, databases, e-mail directories, and schedulers) in a network. SLP is intended to give users an easy-to-use interface to a network's resource information. The protocol defines and oversees communications and operations that take place among entities called user agents (subscribers or workstations), service agents (peripherals and resources), and directory agents (peripherals and resources within service agents). Rearrangement or maintenance of services, or installing new devices, is possible without the need for reconfiguring individual workstations.

Multicast DNS (MDNS)

Multicast DNS (MDNS) is a mechanism for using familiar DNS programming interfaces, packet formats and operating semantics in a small network where no conventional DNS server has been installed.

Universal Plug and Play (UPnP)

Universal Plug and Play (UPnP) is a standard that uses Internet and Web protocols to enable devices such as PCs, peripherals, intelligent appliances, and wireless devices to be plugged into a network and to automatically know about each other. With UPnP, when a user plugs a device into the network, the device will configure itself, acquire a TCP/IP address, and use a discovery protocol based on the Internet's Hypertext Transfer Protocol (HTTP) to announce its presence on the network to other devices.

Jini

Sun Microsysems' Jini™ network technology, which includes JavaSpaces Technology and Jini extensible remote invocation (Jini ERI), is an open architecture that enables developers to create network-centric services—whether implemented in hardware or software—that are highly adaptive to change. Jini technology may be used to build adaptive networks that are scalable, evolvable and flexible as typically required in dynamic computing environments.

SUMMARY

Embodiments of a method and apparatus for multiplexed data communication tunneling channels, which may be referred to as a tunneling mechanism, are described. Embodiments of the tunneling mechanism may provide tunnel sockets between network computing environments that allow a system, device, or service in one networking environment to interconnect with systems, devices and/or services in other networking environments. A tunnel socket is a proxy or bridge across a peer-to-peer network (e.g. a JXTA network) between different networking environments. Tunnel sockets may provide a reliable and secure end-to-end proxy of a device or service without any modification of protocols or loss of functionality. Using the tunneling mechanism, descriptions of devices or services in one format may be translated to a uniform device and service description format, where they may be discovered and translated into other formats in other networking environments for access by entities in the other environments.

Some embodiments of the tunneling mechanism may be implemented on top of JXTA™ as a foundational peer-to-peer platform. Other embodiments may be implemented on other peer-to-peer platforms. The underlying peer-to-peer platform may provide one or more underlying tools, formats, protocols, and/or mechanisms, such as pipes and basic advertisement formats, that may be leveraged by embodiments of the tunneling mechanism.

Some embodiments of the tunneling mechanism may be implemented as a mechanism for device and/or service interconnection in a mechanism for device and service description, transformation (transcoding), discovery, and connectivity in peer-to-peer network computing environments. Note that embodiments of the tunneling mechanism may also be implemented in other networking mechanisms and environments.

In one embodiment, a node on a network may discover a resource in a networking environment on the network. In one embodiment, the node may be a peer node in a peer-to-peer networking environment on the network. The peer-to-peer networking environment may be implemented according to a peer-to-peer platform. In one embodiment, the peer-to-peer platform may be JXTA. The node may obtain a description of the resource formatted according to a protocol of the networking environment in which the resource operates. The description of the resource may then be transcoded to generate an advertisement in a uniform description format. The advertisement may include metadata describing the resource. The advertisement for the resource may then be published on the network. In one embodiment, the advertisement may be published within a user-defined domain in a peer-to-peer networking environment on the network. In one embodiment, the user-defined domain may be a peer group.

A node in a different networking environment may discover the published advertisement for the resource. In one embodiment, the different node may also be a peer node in the peer-to-peer networking environment on the network. The discovered advertisement may then be transcoded from the uniform description format into a description of the resource formatted according to a protocol of the different networking environment. The node in the different networking environment may then access the resource using the description of the resource formatted according to the protocol of the different networking environment. To the node accessing the resource, the resource appears as a resource in the different networking environment.

Figure 1A:
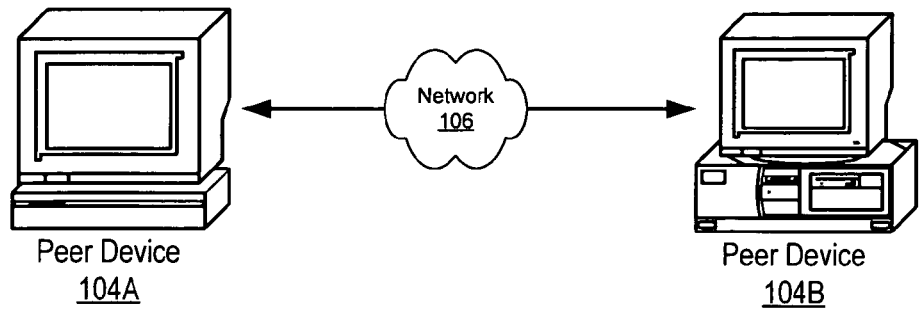
FIG. 1A illustrates a prior art example of two devices that are currently connected as peers.
Figure 1B:
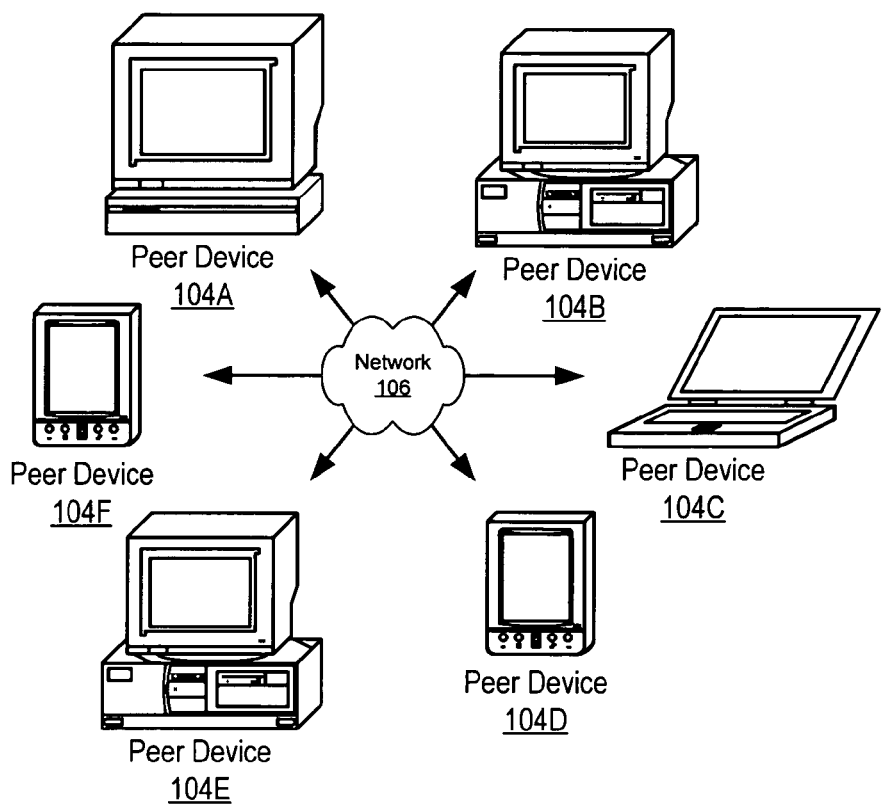
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for multiplexed data communication tunneling channels are described. Embodiments may be referred to herein as a tunneling mechanism. Embodiments of the tunneling mechanism may provide tunnel sockets between network computing environments that allow a system, device, or service in one networking environment to interconnect with systems, devices and/or services in other networking environments. A tunnel socket is a proxy or bridge across a peer-to-peer network (e.g. a JXTA network) between different networking environments. Tunnel sockets may provide a reliable and secure end-to-end proxy of a device or service without any modification of protocols or loss of functionality. On the tunnel socket, descriptions of devices or services in one format (e.g., Service Location Protocol (SLP)) may be translated to a uniform device and service description format, where they may be discovered and translated into other formats in other networking environments (e.g. Multicast Domain Name System (MDNS)) for access by entities in the other environments.

Embodiments of the tunneling mechanism may allow physical communication channels to be described as virtual communication channels. A virtual communication channel provides a physical-to-virtual binding, through which the channel may be located (resolved), within a specific scope (e.g., a JXTA peer group). On the consumer side of the channel, an application or service may bind to a virtual port, or alternatively may expose a physical-to-virtual binding through a Tunnel Server Socket.

Embodiments of the tunneling mechanism may provide a mechanism for device and/or service interconnection in peer-to-peer networks. Some embodiments of the tunneling mechanism may be implemented on top of JXTA™ as a foundational peer-to-peer platform. Other embodiments may be implemented on other peer-to-peer platforms. The underlying peer-to-peer platform may provide one or more underlying tools, formats, protocols, and/or mechanisms, such as pipes and basic advertisement formats, that may be leveraged by embodiments of the tunneling mechanism.

Embodiments of the tunneling mechanism may serve as a mechanism for bridging or proxying between different platforms and protocols in different networking environments on a peer-to-peer network. Using the tunneling mechanism, regardless of the platform(s) used in the networking environments (e.g. Sun Solaris, Linux, Macintosh OS X a.k.a. Mac OsX, etc.), or the particular protocol(s) used in the networking environments (e.g. MDNS, SLP, Jini, Universal Plug and Play (UPnP), etc), peer nodes in one networking environment are transparently able to interconnect and interact with resources in another networking environment on the peer-to-peer network.

Some embodiments of the tunneling mechanism may be implemented as a mechanism for device and/or service interconnection in a mechanism for device and service description, transformation (transcoding), discovery, and connectivity in peer-to-peer network computing environments, which is herein described, and which is hereinafter referred to as a DTDC mechanism for simplicity. Note that embodiments of the tunneling mechanism may also be implemented in other networking mechanisms and environments.

FIGS. 2 through 8 illustrate means for discovering one or more network resources on a network using protocols supported by the network resources, means for obtaining a description for each of the discovered network resources formatted according to a particular protocol supported by the associated network resource, means for translating the descriptions to generate advertisements in a format that provides a uniform representation of the associated network resources, and means for publishing the advertisements in a peer-to-peer networking environment. FIGS. 2 through 8 further illustrate means for discovering a published advertisement for one of the network resources in the peer-to-peer networking environment and means for translating the discovered advertisement to generate a description for the associated network resource in a different format according to a different protocol than the one supported by the associated network resource.

DTDC Mechanism

Embodiments of a mechanism for device and service description, transformation (transcoding), discovery, and connectivity in peer-to-peer network computing environments, or DTDC mechanism, may provide a uniform device and service description and interface, while recognizing slow adoption of new protocols. The DTDC mechanism may provide tools and/or mechanisms to facilitate interface proxying of devices and/or services, including legacy devices and services, in a network computing environment. The DTDC mechanism may enable application developers and end users to define workspaces which best suit their needs, without the need for network administration, regardless of location or network topology. The DTDC mechanism may unify device and service description, discovery, and connectivity. The DTDC mechanism may provide tools and/or mechanisms that enable application developers and other users to design and implement virtual networks consisting of services and/or devices (regardless of location, platform, protocols, etc.) that best suit their needs.

One embodiment of the DTDC mechanism may be implemented on top of JXTA™ as a foundational peer-to-peer platform. Other embodiments may be implemented on other peer-to-peer platforms. The underlying peer-to-peer platform may provide one or more underlying tools, formats, protocols, and/or mechanisms, such as communication channels (or pipes) and basic advertisement formats, that may be leveraged by the DTDC mechanism to provide device and service description, transformation, discovery, and connectivity in peer-to-peer network computing environments.

Embodiments of the DTDC mechanism may be used as a foundation to implement embodiments of the tunneling mechanism, which may provide tunnel sockets between network environments that allow a system in one environment to interconnect with devices and/or services (which may collectively be referred to as resources) in other environments. A tunnel socket is a proxy or bridge across a peer-to-peer protocol network (e.g. a JXTA network) between different environments. On the tunnel socket, descriptions of devices or services in one format (e.g. SLP) may be translated to the uniform device and service description format, where they may be discovered and translated into other formats in other environments (e.g. MDNS) for access by entities in the other environment.

Embodiments of the DTDC mechanism may provide mechanisms for bridging or proxying between different platforms and protocols. Using the DTDC mechanism, regardless of the devices or platforms on which services are running (e.g. Sun Solaris, Linux, Macintosh OS X a.k.a. Mac OsX, etc.) or discovery protocol (e.g. MDNS, SLP, Jini, UPnP, etc) that devices support, devices and services are transparently able to interconnect and interact in a peer-to-peer networking environment.

Embodiments of the DTDC mechanism may provide generic mechanisms for describing, advertising, and discovering devices and/or services in a peer-to-peer network computing environment. The DTDC mechanism may allow devices and/or services to be described, advertised, and discovered using physical and/or logical (virtual) addresses. The DTDC mechanism may be used to describe, advertise, and discover devices (e.g. printers, disk drives, or any other networkable device) and/or services in terms of their capabilities; to discover, describe and advertise location (e.g. GPS location information) for the devices and/or services; and may allow the devices and/or services to participate in a peer-to-peer network computing environment using physical and/or virtual addresses regardless of the devices' or services' underlying platforms, supported protocols, and/or locations.

In one embodiment of the DTDC mechanism, description, discovery, and advertisement of devices and/or services may be implemented using an underlying peer-to-peer platform such as the JXTA peer-to-peer platform, and the DTDC mechanism may provide mechanisms for interconnecting heterogeneous devices and/or services across the peer-to-peer platform computing environment. The DTDC mechanism may provide a standard way to describe, advertise and discover devices and/or services in a peer-to-peer computing environment not provided by the underlying peer-to-peer platform. The DTDC mechanism may allow devices and/or services in one environment (e.g. operating platform such as Solaris, protocols such as SLP and MDNS, etc.) to be exposed in other environments using different platforms and protocols. For example, a printer in a Solaris environment may be exposed to other systems in other environments, for example a Macintosh OS X (Mac OsX) environment, and accessed from the other system as if the printer was a device in that environment.

Figures 2, 3:
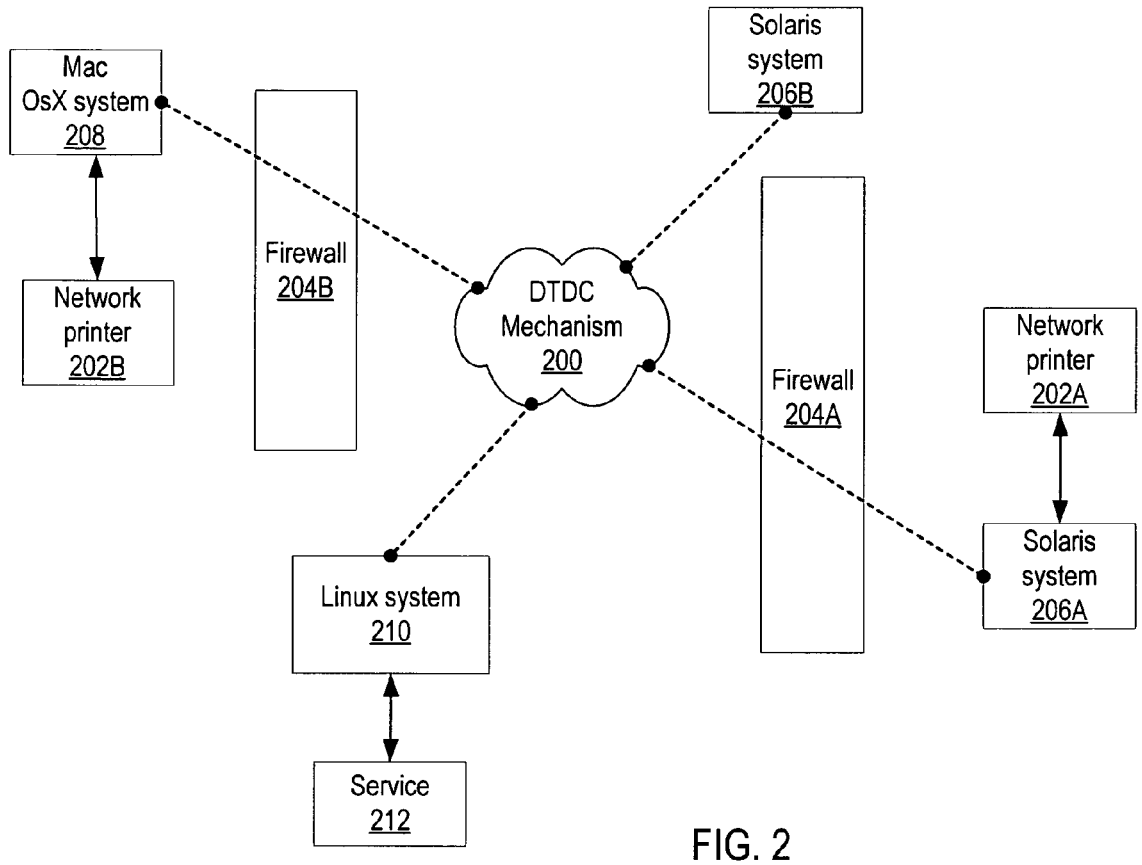
FIG. 2 illustrates an exemplary implementation of an embodiment of mechanism(s) for device and service description, transformation (transcoding), discovery, and connectivity (DTDC mechanism) in a peer-to-peer networking environment.
FIG. 3 illustrates an exemplary printer advertisement according to one embodiment.

FIG. 2 illustrates an exemplary implementation of an embodiment of the DTDC mechanism in a peer-to-peer networking environment. In FIG. 2, Solaris systems 206A and 206B may be peer nodes in Solaris networking environments, Mac OsX system 208 may be a peer node in a Macintosh OsX networking environment, and Linux system 210 may be a peer node in a Linux networking environment. As peer nodes, the systems may participate as peers in a peer-to-peer networking environment on a network. One or more of the systems may operate behind firewalls. In this example, Mac OsX system 208 operates behind firewall 204B, and Solaris system 206A operates behind firewall 204A. One or more of the systems may be coupled to devices and/or provide services in their networking environments. In this example, Solaris system 206A is coupled to network printer 202A in its networking environment, Mac OsX system 208 is coupled to network printer 202B in its networking environment, and Linux system 210 provides a service 212 in its networking environment. Note that the devices and/or services may be "legacy" devices or services that are not part of the peer-to-peer network.

The DTDC mechanism 200 may enable application developers and other users to design and implement virtual networks consisting of services and/or devices (regardless of location, platform, protocols, networking environment, etc.) that best suit their needs. Devices and/or services may be discovered in one networking environment using a protocol of the environment, e.g. SLP in a Solaris environment and advertised in a uniform description format of the DTDC mechanism. The advertisement may be discovered, and the advertised device or service may be accessed, from another networking environment, e.g. from a Macintosh OsX or Linux environment. In the other networking environment (e.g., Macintosh OsX), the devices and/or services may appear as if they are entities in the local networking environment. The DTDC mechanism 200 may provide this access across one or more firewalls, if necessary.

For example, using DTDC mechanism 200, a legacy network printer 202A in a Solaris environment may be discovered by Solaris system 206A, for example using SLP. A device description for the printer 202A in the format of the protocol (e.g., SLP) may be transcoded into a description or advertisement in a uniform description format of the DTDC mechanism, such as a JXTA advertisement. The advertisement may include one or more of, but is not limited to, location information for the device or service (e.g. GPS information such as latitude, longitude, and altitude), a unique identifier for the device or service, name and type of the device or service, pipe information for accessing the device or service, description(s) of capabilities of the device or service, (e.g. printing capabilities for a printer, capacity and other capabilities for a disk drive, functionality of a service, etc.), etc. The advertisement in the uniform description format may be published on the peer-to-peer networking environment for discovery by other entities, potentially in other networking environments, that may or may not support the protocol of the device or service (e.g. SLP, in this example).

As an example, Mac OsX system 208 may discover the published advertisement in the uniform description format for network printer 202A in the Solaris environment. The advertisement in the uniform description format may be translated (transcoded) into a device or service description format used by Mac OsX system 208 in the Macintosh OsX environment, e.g. MDNS (also referred to as the Apple Rendezvous Protocol). Mac OsX system 208 may then access network printer 202A according to the protocol of its networking environment (MDNS). To Mac OsX system 208, it appears that printer 202A is being accessed according to the protocol of its local networking environment, when in effect the DTDC mechanism 200 is transparently proxying the device or service for the entity.

In heterogeneous environments, devices and services may be described and advertised in a variety of ways. In addition, many systems in such environments may lack a unified discovery mechanism and/or the ability to uniquely identify such devices and services. For device and service advertisement and discovery, embodiments of DTDC mechanism 200 may address these deficiencies by providing one or more mechanisms that facilitate one or more of, but not limited to:

Discovery of devices and services (over one or more protocols)

Local caching, e.g. of service and/or device descriptions (advertisements)

Assigning Unique Identifiers to devices and/or services

Transformation from one service and/or device description representation into a uniform representation (Service and Device advertisements)

Publication of advertisements within a user defined domain (e.g. a peer group of a peer-to-peer platform such as JXTA™)

Advertisement discovery

Locality, including, but no limited to, discovery and advertisement of location information (e.g. GPS information) for services and devices on a network Once a service or device is identified and described, it may be published and discovered, in one embodiment within a user defined domain (e.g. a peer group such as a JXTA™ Peer Group).

For device and service description in peer-to-peer network computing environments, DTDC mechanism 200 may define a set of device and/or service description mechanisms (which may be referred to herein as advertisements) that may provide detailed description(s) of their associated device and/or service. Advertisements may provide a rich representation of the associated devices and services, and may provide a uniform representation of services and/or devices to entities in a peer-to-peer network computing environment. These advertisements may include one or more of, but are not limited to, information such as global positioning information, unique identification (e.g., JXTA's unique identifiers (UUIDs)), and other metadata. Advertisements may also include local interface information and/or virtual interface information. Advertisements may be advertised and made available within the peer-to-peer network computing environment, such as a JXTA™ network. Advertisements may provide the application developer flexibility and extensibility in device and service description. In embodiments of DTDC mechanism 200 based on JXTA, JXTA may provide definitions and implementations for basic advertisements that may be used by the DTDC mechanism 200. Advertisements may be markup language documents. In one embodiment, the markup language may be XML.

As an example, an advertisement may provide detailed information about a printer or other device including one or more of, but not limited to, type, location, capabilities, configuration, and local and/or virtual interface information for the device. FIG. 3 illustrates an exemplary printer advertisement according to one embodiment. In this example, the advertisement includes, but is not limited to, the printer's name, identifier (UUID), description, pipe identifier (a pipe is a communication channel), type, and location.

Figure 4:
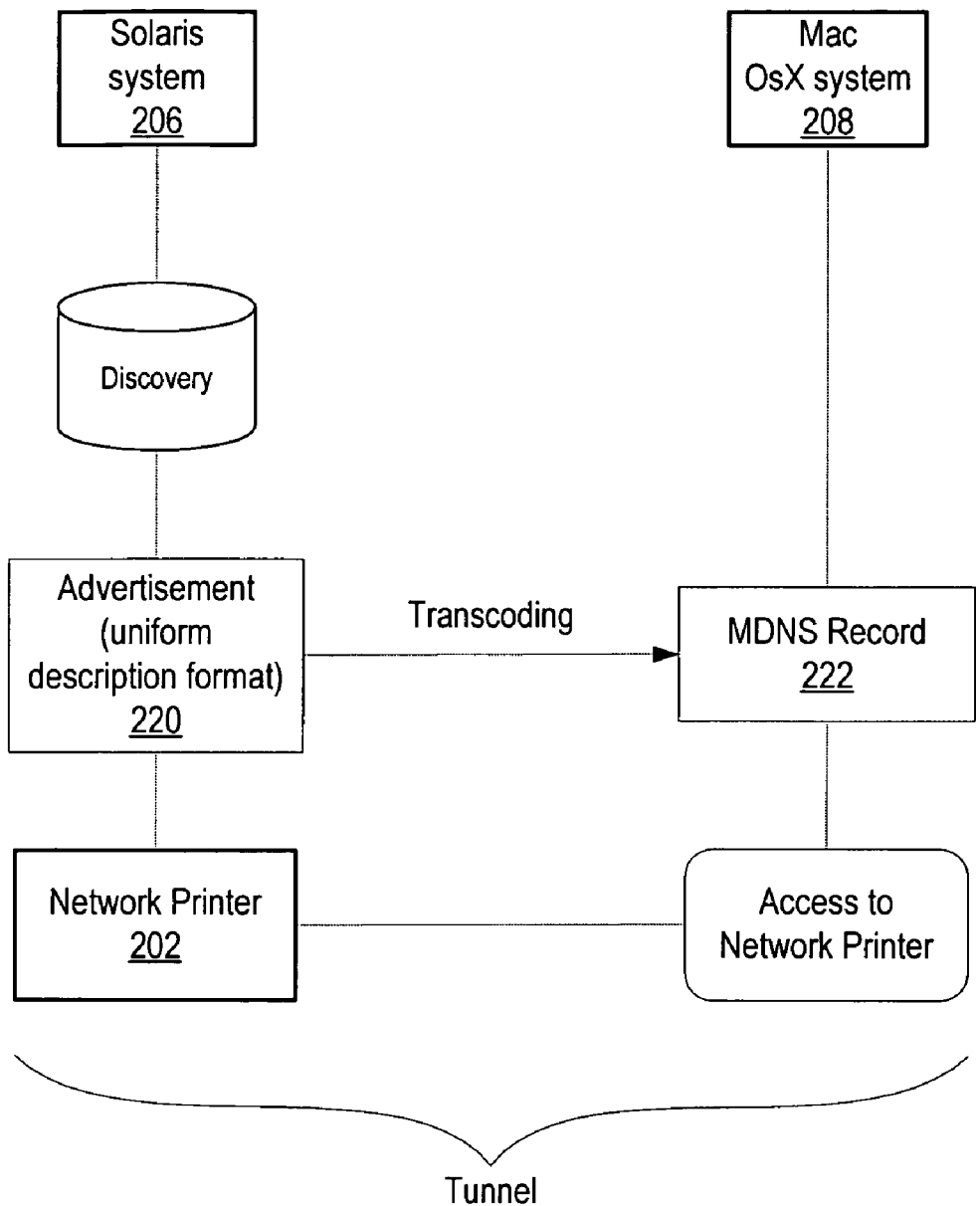
FIG. 4 illustrates transcoding a printer description between an MDNS record format and an exemplary advertisement format according to one embodiment.

FIG. 4 illustrates transcoding a printer description between an advertisement in a uniform description format used by the DTDC mechanism and an MDNS record format according to one embodiment. For description transcoding in peer-to-peer network computing environments, the DTDC mechanism may provide one or more mechanisms that transform a device or service description from other description systems to a uniform description format of the DTDC mechanism and vice versa. For example, a printer may be described as a Multicast Domain Name System (MDNS) record or using Service Location Protocol (SLP). Such devices can be discovered, for example using MDNS, and the device description may then be transcoded or translated into an advertisement in a uniform description format as described above, assigned a unique identifier, and advertised within the virtual network, e.g. a JXTA™ virtual network.

For device and/or service interconnection, the DTDC mechanism may provide one or more mechanisms to interconnect devices and services (which may collectively be referred to as resources) regardless of location or topology. The DTDC mechanism may recognize and provide mechanisms for interconnecting legacy devices and services. The DTDC mechanism may provide mechanisms to address the slow adoption of new protocols. The DTDC mechanism may provide a set of tools or mechanisms that provide interconnects to enable connectivity regardless of type of transport (e.g. TCP/IP, IrDA, RS-232, Bluetooth, etc.), or location (e.g. across domains) without the need of network administration. An example of such a tool or mechanism may be an embodiment of the tunneling mechanism that may be used to implement tunnel sockets that provide a reliable and secure end-to-end proxy of a device or service without any modification of protocols or loss of functionality.

Figure 5:
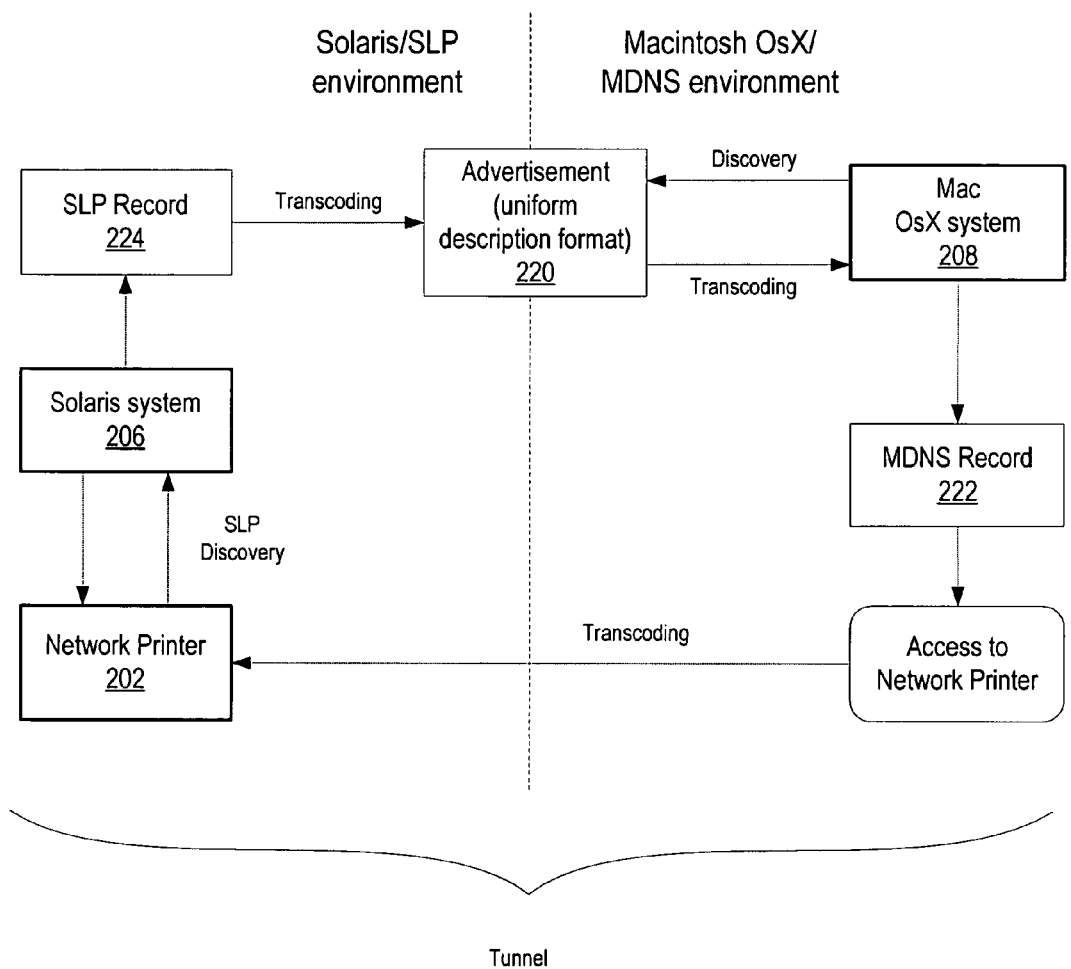
FIG. 5 illustrates a virtual network with an entity in one networking environment accessing a device or service in another networking environment according to one embodiment of the tunneling mechanism.

FIG. 5 illustrates a virtual network with an entity in one networking environment accessing a device or service in another networking environment according to one embodiment of the tunneling mechanism. The tunneling mechanism may provide tunnel sockets between networking environments that allow a system in one environment to interconnect with resources (e.g., devices and/or services) in other environments. In one embodiment, a DTDC mechanism such as that described above may be used as a foundation to implement the tunneling mechanism.

Mac OsX system 208 and Solaris system 206 may also be referred to as "nodes" on the network. In one embodiment, Mac OsX system 208 and Solaris system 206 may be peer nodes in a peer-to-peer networking environment on the network. In one embodiment, the systems (Solaris system 206 and Mac OS system 208) may be peer nodes in a peer-to-peer networking environment that is a "virtual" network across two or more networking environments on the network. For example, Solaris systems 206 may be a peer node in a Solaris/SLP networking environment, and Mac OsX system 208 may be a peer node in a Macintosh OsX/MDNS networking environment. The peer-to-peer networking environment may be implemented according to a peer-to-peer platform. In one embodiment, the peer-to-peer platform may be JXTA. Other embodiments may use other peer-to-peer platforms.

Solaris system 206 may discover a network printer 202 in the Solaris/SLP environment using SLP, generating an SLP record 224 describing the printer 202. SLP record 224 may then be transcoded into an advertisement 220 in a uniform description format (e.g., a JXTA advertisement) and published on the network. The published advertisement 220 may be discovered by other entities in other networking environments on the network, for example Mac OsX system 208 in a Macintosh OsX/MDNS environment. The discovered advertisement 220 may then be transcoded into an MDNS record 222 describing the printer 202 which may be used by Mac OsX system 208 to access network printer 202 in the Solaris/SLP environment. In one embodiment, the tunneling mechanism may provide transparent transcoding of command messages issued by Mac OsX system 208 for network printer 202 and for response messages from network printer 202 to Mac OsX system 208. To Mac OsX system 208, it appears that network printer 202 is being accessed according to the system's local network environment protocol (MDNS), when in effect the tunneling mechanism is transparently proxying the network printer 202 for Mac OsX system 208 via the tunnel socket established using the tunneling mechanism.

Note that FIG. 5 illustrates the tunneling mechanism used for accessing a device, specifically a printer, in a different networking environment. The tunneling mechanism may also be used for accessing other types of devices than printers, as well as for accessing services. Therefore, in this example, any other type of network-accessible resource (e.g., device and/or service) in one networking environment may be accessed using the tunneling mechanism from another networking environment. Also note that, while this example shows a device in a Solaris/SLP environment being accessed by an entity in a Macintosh OsX/MDNS environment, the tunneling mechanism may be used for accessing resources in or from other networking environments than these exemplary environments.

Figure 6:
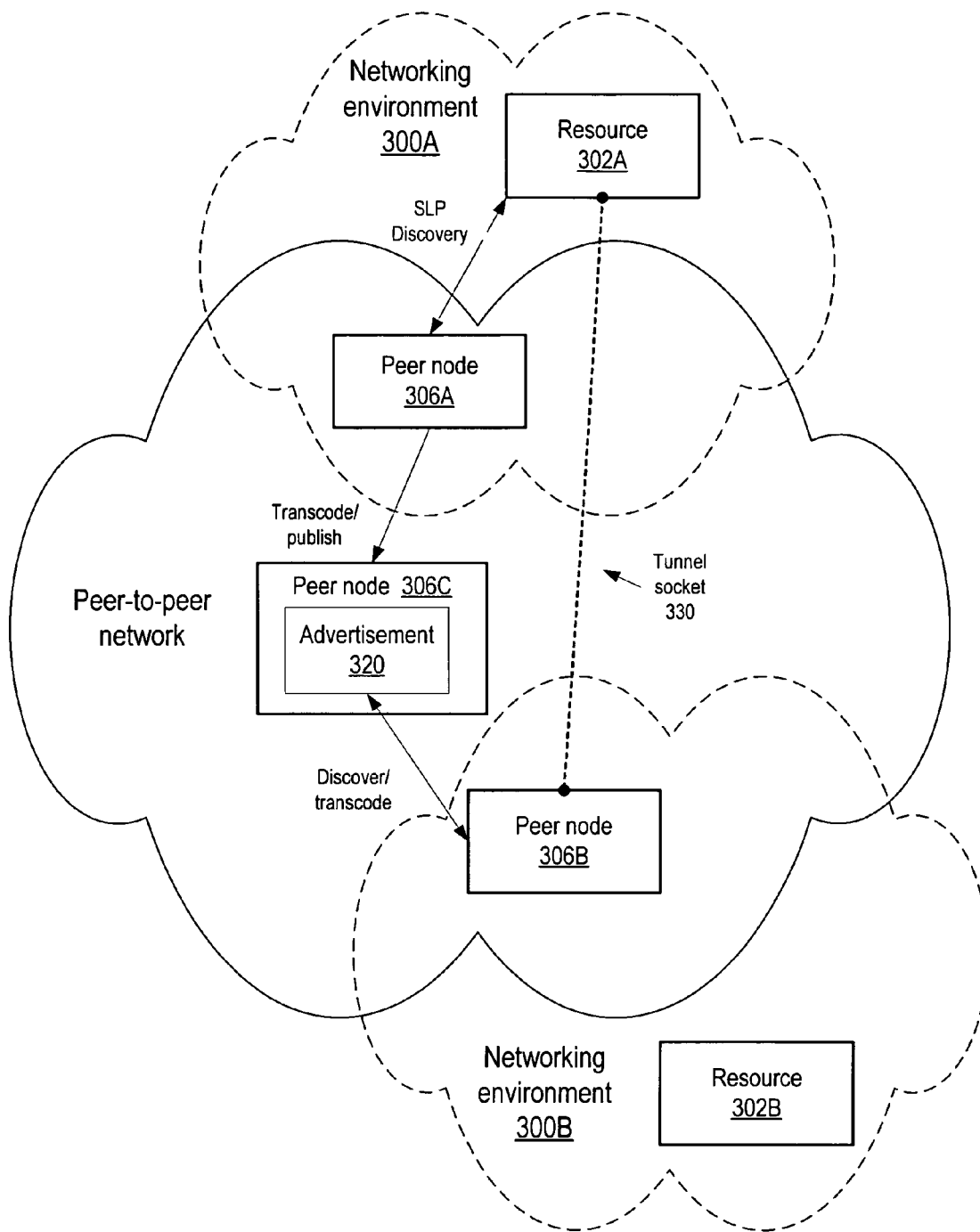
FIG. 6 illustrates a peer-to-peer network with a peer node in one networking environment accessing a resource in another networking environment according to one embodiment of the tunneling mechanism.

FIG. 6 illustrates a peer-to-peer network with a peer node in one networking environment accessing a resource (e.g., a device or service) in another networking environment according to one embodiment of the tunneling mechanism. A peer-to-peer network may include two or more peer nodes, in this example peer nodes 306A, 306B, and 306C. In one embodiment, each peer node 306 may include an instance of code to implement a tunneling mechanism as described herein.

Peer node 306A may discover a resource 302A in networking environment 300A using a protocol of that networking environment, and may obtain or generate a record for the resource 302A formatted according to the protocol and describing the resource 302A. The record for resource 302A may then be transcoded into an advertisement 320 in a uniform description format (e.g., a JXTA advertisement) and published on the peer-to-peer network. In this example, the advertisement 320 has been published to peer node 306C. Note that the advertisement 320 may be published elsewhere in the peer-to-peer network, including on peer node 306A.

The published advertisement 320 may be discovered by other peer nodes in other networking environments on the peer-to-peer network, for example peer node 306B in networking environment 300B. The discovered advertisement 320 may then be transcoded into a record formatted according to a protocol of networking environment 300B and describing resource 302A, which may be used by peer node 306B to access resource 302A from networking environment 300B. Information in the record may be used to establish a multiplexed communication channel (tunnel socket 330) between peer node 306B and resource 302A and across networking environments.

In one embodiment, the tunneling mechanism may provide transparent transcoding of messages issued by peer node 306B for resource 302A and for messages from resource 302A to peer node 306B to translate the messages between networking environments. To peer node 306B, it appears that resource 302A is being accessed according to the peer node's local network environment protocol, when in effect the tunneling mechanism is transparently proxying the resource 302A for peer node 306B via the tunnel socket 330 established using the tunneling mechanism.

Note that networking environment 300B may include a resource 302B. Peer node 306B may discover resource 302B, obtain a record formatted according to a protocol of networking environment 300B, transcode the record to generate an advertisement in the uniform description formation, and publish the advertisement on the peer-to-peer network as was described for resource 302A and peer node 306A above. Peer node 306A may then discover the advertisement for resource 302B, which may then be transcoded into a record formatted according to a protocol of networking environment 300A.

Peer node 306A may then access resource 302B using the record as was described for peer node 306B and resource 302A.

Figure 7A:
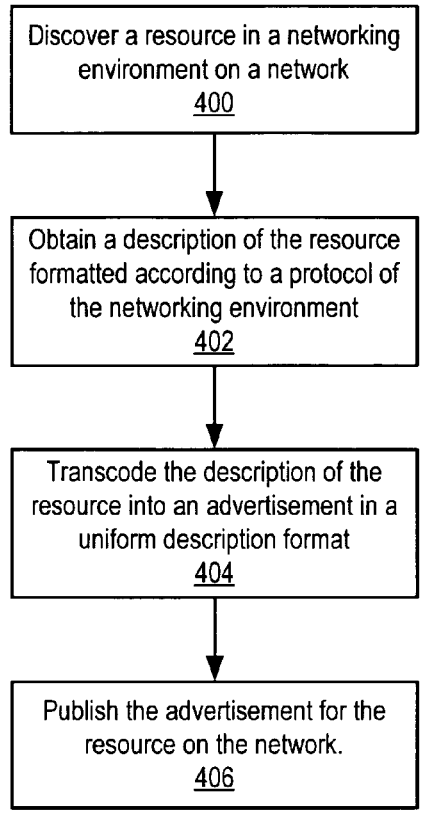
FIG. 7A is a flowchart illustrating a method of discovering and advertising network resources according to one embodiment of the tunneling mechanism.
Figure 7B:
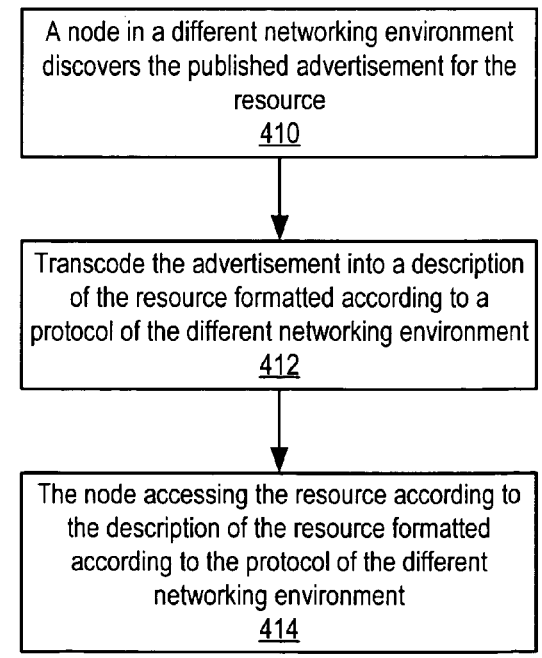
FIG. 7B illustrates a node on a network operating in a different networking environment than an advertised resource discovering a published advertisement for the resource and accessing the resource according to one embodiment of the tunneling mechanism.

FIGS. 7A and 7B are flowcharts illustrating the operation of a tunneling mechanism according to one embodiment. FIG. 7A is a flowchart illustrating a method of discovering and advertising network resources according to one embodiment of the tunneling mechanism. As indicated at 400, a node on the network may discover a resource in a networking environment on the network. In one embodiment, the node may be a peer node in a peer-to-peer networking environment on the network. The peer-to-peer networking environment may be implemented according to a peer-to-peer platform. In one embodiment, the peer-to-peer platform may be JXTA. The discovered resource may be one of, but not limited to, a device in the networking environment or a service implemented on another node in the networking environment.

As indicated at 402, the node may obtain or generate a description of the resource formatted according to a protocol of the networking environment. As indicated at 404, the description of the resource may then be transcoded to generate an advertisement in a uniform description format. The advertisement may include metadata describing the resource. The metadata may include one or more of, but is not limited to, global positioning information, a unique identifier, a name, a description, a type, and a pipe identifier for the resource.

As indicated at 406, the advertisement for the resource may then be published on the network. In one embodiment, the advertisement may be published within a user-defined domain in a peer-to-peer networking environment on the network. In one embodiment, the user-defined domain may be a peer group.

FIG. 7B illustrates a different node on the network operating in a different networking environment than an advertised resource discovering the published advertisement for the resource and accessing the resource according to one embodiment of the tunneling mechanism. In one embodiment, the different node may also be a peer node in the peer-to-peer networking environment on the network. The peer-to-peer networking environment may be implemented according to a peer-to-peer platform. In one embodiment, the peer-to-peer platform may be JXTA. In one embodiment, the networking environment that the resource is in and the different networking environment that the different node is in may differ in one or more of underlying platforms and protocols supported by network resources in the networking environments.

As indicated at 410, the node in the different networking environment may discover the published advertisement for the resource on the network. As indicated at 412, the advertisement may then be transcoded from the uniform description format into a description of the resource formatted according to a protocol of the different networking environment. As indicated at 414, the node in the different networking environment may then access the resource using the description of the resource formatted according to the protocol of the different networking environment. To the node accessing the resource, the resource appears as a resource in the different networking environment.

Figure 8:
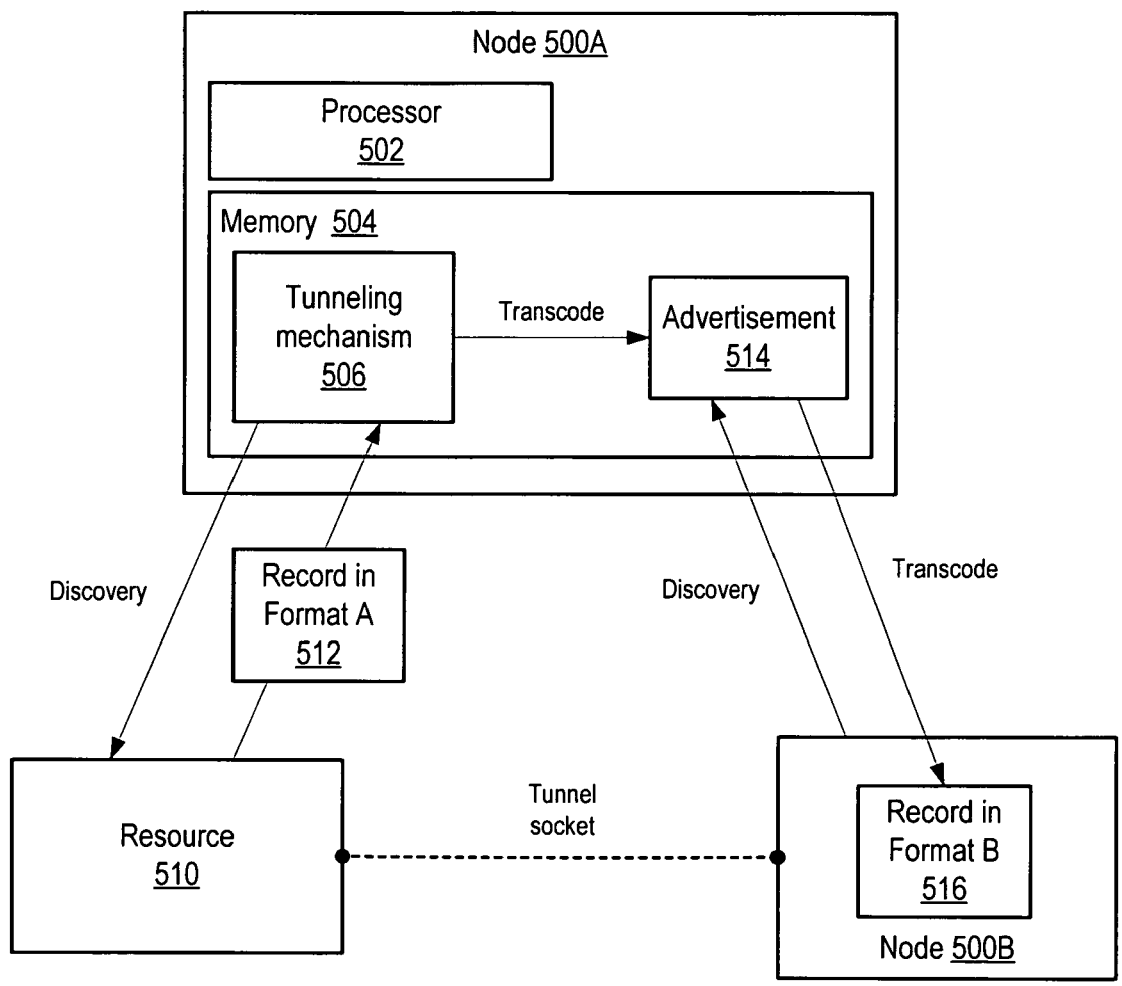
FIG. 8 illustrates a node hosting a tunneling mechanism according to one embodiment.

FIG. 8 illustrates a node hosting a tunneling mechanism according to one embodiment. Node 500A may be any of various types of devices, including, but not limited to, a personal computer system, desktop computer, laptop or notebook computer, mainframe computer system, workstation, network computer, Personal Digital Assistant (PDA), or other suitable device. In general, node 500A may be any device with a digital heartbeat. Node 500A may include at least one processor 502. The processor 502 may be coupled to a memory 504. Memory 504 is representative of various types of possible memory media, also referred to as "computer readable media" or "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 500A may couple over a network or networks to one or more other devices via one or more wired or wireless network interfaces.

Node 500A may include, in memory 504, an instance of a tunneling mechanism 506. Node 500A may discover a resource 510 in a first networking environment using a protocol of that networking environment, and may obtain or generate a record 512 for the resource 510 formatted according to the protocol and describing the resource 510. The record 512 for resource 510 may then be transcoded into an advertisement 514 in a uniform description format (e.g., a JXTA advertisement) and published on the network. Note that the advertisement 514 may be published to other nodes on the network.

The published advertisement 514 may be discovered by other nodes in other networking environments on the network, for example node 500B. The discovered advertisement 514 may then be transcoded into a record 516 describing resource 510 and formatted according to a protocol used in the networking environment of node 500B, which may the be used by node 500B to access resource 510 from its networking environment. Information in the record may be used to establish a multiplexed communication channel, or tunnel socket, between node 500B and resource 510 and across networking environments.

Note that node 500B may be a device with an architecture similar to the description of node 500A, with at least one processor and a memory similar to those described for node 500A. Node 500B may also include an instance of tunneling mechanism 506 in memory, similar to node 500A. Also note that the systems and nodes described in FIGS. 2, 4, 5 and 6 may each have a similar architecture as that described for node 500A of FIG. 8, and may each include an instance of the tunneling mechanism in memory.

In one embodiment, the tunneling mechanism may provide transparent transcoding of messages issued by node 500B for resource 510 and for messages from resource 510 to node 500B to translate the messages between networking environments. To node 500B, it appears that resource 510 is being accessed according to the node's local network environment protocol, when in effect the tunneling mechanism is transparently proxying the resource 510 for node 500B via the tunnel socket established using the tunneling mechanism.

Peer-to-Peer Platform Implementation

Sun Microsystems's JXTA™ is an exemplary peer-to-peer platform that provides a virtual network overlay on top of the Internet, allowing peers to directly interact and self-organize independently of their network connectivity and domain topology (e.g. firewalls and/or NATs). As previously mentioned, some embodiments of the DTDC mechanism and/or tunneling mechanism may be implemented on top of JXTA™ as a foundational peer-to-peer platform. Other embodiments may be implemented on other peer-to-peer platforms. The underlying peer-to-peer platform may provide one or more underlying tools, formats, protocols, and/or mechanisms, such as pipes and basic advertisement formats, that may be leveraged to provide device and service description, transformation, discovery, and connectivity in peer-to-peer network computing environments.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A network computing system, comprising:
   a node in a networking environment on a network, wherein the node in the networking environment is configured to:
      obtain a description of a resource in the networking environment formatted according to a protocol of the networking environment;
      translate the description of the resource formatted according to the protocol of the networking environment into an advertisement in a uniform description format; and
      publish the advertisement for the resource on the network for discovery by other nodes in at least one different networking environment on the network; and
   a node in the different networking environment on the network, wherein the node in the different networking environment is configured to:
      discover the published advertisement for the resource on the network and obtain a translation of the discovered advertisement in a description of the resource formatted according to a protocol of the different networking environment;
      establish, according to information in the description of the resource, a tunnel socket on the network between the resource in the networking environment and the node in the different networking environment, wherein the tunnel socket provides a multiplexed communications channel; and
      communicate with the resource via the tunnel socket and in accordance with the description of the resource formatted according to the protocol of the different networking environment;
   wherein the tunnel socket is configured to:
      translate messages sent to the resource in the networking environment by the node in the different networking environment into the protocol of the networking environment; and
      translate messages sent by the resource to the node in the different networking environment into the protocol of the different networking environment.

2. The network computing system as recited in claim 1, wherein the nodes are peer nodes in a peer-to-peer networking environment on the network.

3. The network computing system as recited in claim 2, wherein the peer-to-peer networking environment is implemented according to a peer-to-peer platform.

4. The network computing system as recited in claim 3, wherein the peer-to-peer platform is JXTA.

5. The network computing system as recited in claim 1, wherein, to the node in the different networking environment, the resource in the networking environment represented by the description of the resource formatted according to the protocol of the different networking environment appears as a resource in the different networking environment.

6. The network computing system as recited in claim 1, wherein the networking environment and the different networking environment differ in one or more of underlying platforms and protocols supported by network resources in the networking environments.

7. The network computing system as recited in claim 1, wherein, to publish the advertisement on the network, the node in the networking environment is further configured to publish the advertisement within a user-defined domain in a peer-to-peer networking environment on the network.

8. The network computing system as recited in claim 7, wherein the user-defined domain is a peer group.

9. The network computing system as recited in claim 1, wherein the resource is a device in the networking environment.

10. The network computing system as recited in claim 1, wherein the resource is a service implemented on another node in the networking environment.

11. The network computing system as recited in claim 1, wherein the advertisement includes metadata describing the resource, wherein the metadata includes one or more of global positioning information, a unique identifier, a name, a description, a type, and a pipe identifier for the resource.

12. A network computing system, comprising:
   a plurality of peer nodes in a peer-to-peer networking environment on a network;
   at least one of the peer nodes configured to:
      discover one or more network resources on the network using one or more protocols supported by the network resources;
      obtain a description for each of the discovered network resources, wherein each description is formatted according to one of the one or more protocols supported by the associated network resource;
      translate the descriptions to generate advertisements in a format that provides a uniform representation of associated network resources in the peer-to-peer networking environment; and
      publish the advertisements in the peer-to-peer networking environment for discovery by entities on the network;
   an entity on the network configured to discover one of the advertisements associated with one of the network resources;
   wherein the at least one of the peer nodes is further configured to:

translate the discovered advertisement to generate a description for the associated network resource in a different format used by the entity; and establish, according to information in the description of the network resource, a tunnel socket on the network between the network resource and the entity, wherein the tunnel socket provides a multiplexed communications channel;

wherein the entity is further configured to communicate with the network resource via the tunnel socket and in accordance with the description of the network resource in the different format used by the entity;

wherein the tunnel socket is configured to:

translate messages sent to the network resource by the entity into a protocol used by the network resource; and translate messages sent by the network resource to the entity into a different protocol used by the entity.

13. The network computing system as recited in claim 12, wherein, to the entity, the network resource associated with the description in the different format used by the entity appears as a resource in a local networking environment of the entity.

14. The network computing system as recited in claim 12, wherein the network resources include one or more network devices on the network and one or more network services implemented on nodes on the network.

15. The network computing system as recited in claim 14, wherein the network devices include heterogeneous network devices in different networking environments, and wherein the network services include heterogeneous network services in different networking environments.

16. The network computing system as recited in claim 15, wherein the networking environments differ in one or more of underlying platforms and protocols supported by networking devices and networking services in the networking environments.

17. The network computing system as recited in claim 12, wherein the peer-to-peer networking environment is implemented according to a peer-to-peer platform.

18. The network computing system as recited in claim 17, wherein the peer-to-peer platform is JXTA.

19. The network computing system as recited in claim 12, wherein each advertisement includes metadata describing an associated network resource, wherein the metadata includes one or more of global positioning information, a unique identifier, a name, a description, a type, and a pipe identifier for the associated network resource.

20. A network computing system, comprising:

means for discovering one or more network resources on a network using one or more protocols supported by the network resources;

means for obtaining a description for each of the discovered network resources, wherein each description is formatted according to one of the one or more protocols supported by the associated network resource;

means for translating the descriptions to generate advertisements in a format that provides a uniform representation of associated network resources in a peer-to-peer networking environment;

means for publishing the advertisements in the peer-to-peer networking environment;

means for discovering a published advertisement for one of the network resources in the peer-to-peer networking environment;

means for translating the discovered advertisement to generate a description for the network resource in a different format according to a different protocol than the protocol supported by the associated network resource;

means for establishing, according to information in the description of the network resource, a tunnel socket on the network between the network resource and an entity on the network, wherein the tunnel socket provides a multiplexed communications channel;

means for translating messages sent to the network resource by the entity on the tunnel socket into a message protocol used by the network resource; and means for translating messages sent by the network resource to the entity on the tunnel socket into a different message protocol used by the entity.

21. A method, comprising:

discovering a resource in a networking environment on a network;

obtaining a description of the resource formatted according to a protocol of the networking environment;

translating the description of the resource formatted according to the protocol of the networking environment into an advertisement in a uniform description format;

publishing the advertisement for the resource on the network for discovery by nodes in at least one different networking environment on the network;

a node in a different networking environment on the network discovering the published advertisement for the resource;

translating the advertisement into a description of the resource formatted according to a protocol of the different networking environment;

establishing, according to information in the description of the resource, a tunnel socket on the network between the resource in the networking environment and the node in the different networking environment, wherein the tunnel socket provides a multiplexed communications channel;

the node communicating with the resource via the tunnel socket and in accordance with the description of the resource formatted according to the protocol of the different networking environment;

the tunnel socket translating messages sent to the resource in the networking environment by the node in the different networking environment into the protocol of the networking environment; and the tunnel socket translating messages sent by the resource to the node in the different networking environment into the protocol of the different networking environment.

22. The method as recited in claim 21, wherein the node is a peer node in a peer-to-peer networking environment on the network.

23. The method as recited in claim 22, wherein the peer-to-peer networking environment is implemented according to a peer-to-peer platform.

24. The method as recited in claim 23, wherein the peer-to-peer platform is JXTA.

25. The method as recited in claim 21, wherein, to the node in the different networking environment, the resource in the networking environment represented by the description of the resource formatted according to the protocol of the different networking environment appears as a resource in the different networking environment.

26. The method as recited in claim 21, wherein the networking environment and the different networking environment differ in one or more of underlying platforms and protocols supported by network resources in the networking environments.

27. The method as recited in claim 21, wherein said publishing the advertisement on the network comprises publishing the advertisement within a user-defined domain in a peer-to-peer networking environment on the network.

28. The method as recited in claim 27, wherein the user-defined domain is a peer group.

29. The method as recited in claim 21, wherein the resource is a device in the networking environment.

30. The method as recited in claim 21, wherein the resource is a service implemented on another node in the networking environment.

31. The method as recited in claim 21, wherein the advertisement includes metadata describing the resource, wherein the metadata includes one or more of global positioning information, a unique identifier, a name, a description, a type, and a pipe identifier for the resource.

32. A method, comprising:
  one or more peer nodes in a peer-to-peer networking environment on a network discovering one or more network resources using one or more protocols supported by the network resources;
  the one or more peer nodes obtaining a description for each of the discovered network resources, wherein each description is formatted according to one of the one or more protocols supported by the associated network resource;
  translating the descriptions to generate advertisements in a format that provides a uniform representation of associated network resources in the peer-to-peer networking environment;
  publishing the advertisements in the peer-to-peer networking environment for discovery by entities on the network;
  an entity on the network discovering one of the advertisements associated with one of the network resources;
  translating the discovered advertisement to generate a description for the associated network resource in a different format used by the entity;
  establishing, according to information in the description of the network resource, a tunnel socket on the network between the network resource and the entity, wherein the tunnel socket provides a multiplexed communications channel;
  the entity communicating with the network resource via the tunnel socket and in accordance with the description of the network resource in the different format used by the entity;
  the tunnel socket translating messages sent to the network resource by the entity into a protocol used by the network resource; and
  the tunnel socket translating messages sent by the network resource to the entity into a different protocol used by the entity.

33. The method as recited in claim 32, wherein, to the entity, the network resource associated with the description in the different format used by the entity appears as a resource in a local networking environment of the entity.

34. The method as recited in claim 32, wherein the network resources include one or more network devices on the network and one or more network services implemented on nodes on the network.

35. The method as recited in claim 34, wherein the network devices include heterogeneous network devices in different networking environments, and wherein the network services include heterogeneous network services in different networking environments.

36. The method as recited in claim 35, wherein the networking environments differ in one or more of underlying platforms and protocols supported by networking devices and networking services in the networking environments.

37. The method as recited in claim 32, wherein the peer-to-peer networking environment is implemented according to a peer-to-peer platform.

38. The method as recited in claim 37, wherein the peer-to-peer platform is JXTA.

39. The method as recited in claim 32, wherein each advertisement includes metadata describing an associated network resource, wherein the metadata includes one or more of global positioning information, a unique identifier, a name, a description, a type, and a pipe identifier for the associated network resource.

40. A computer-accessible storage medium storing program instructions, wherein the program instructions are computer-executable to implement:
  a node discovering a resource in a networking environment on a network;
  the node obtaining a description of the resource formatted according to a protocol of the networking environment;
  the node translating the description of the resource formatted according to the protocol of the networking environment into an advertisement in a uniform description format;
  the node publishing the advertisement for the resource on the network for discovery by other nodes in at least one different networking environment on the network;
  in response to discovery of the published advertisement by a different node in a different networking environment:
    the node translating the advertisement into a description of the resource formatted according to a protocol of the different networking environment;
    the node establishing, according to information in the description of the resource, a tunnel socket on the network between the resource in the networking environment and the different node in the different networking environment, wherein the tunnel socket provides a multiplexed communications channel, wherein tunnel socket is configured to enable communications between the different node in the different networking environment and the resource in accordance with the description of the resource;
  the tunnel socket translating messages sent to the resource in the networking environment by the different node in the different networking environment into the protocol of the networking environment; and
  the tunnel socket translating messages sent by the resource to the different node in the different networking environment into the protocol of the different networking environment.

41. The computer-accessible storage medium as recited in claim 40, wherein the node and the different node are peer nodes in a peer-to-peer networking environment on the network.

42. The computer-accessible storage medium as recited in claim 41, wherein the peer-to-peer networking environment is implemented according to a peer-to-peer platform.

43. The computer-accessible storage medium as recited in claim 42, wherein the peer-to-peer platform is JXTA.

44. The computer-accessible storage medium as recited in claim 40, wherein, in said accessing the resource, the resource appears as a resource in the different networking environment to the different node in the different networking environment.

45. The computer-accessible storage medium as recited in claim 40, wherein the networking environment and the different networking environment differ in one or more of underlying platforms and protocols supported by network resources in the networking environments.

46. The computer-accessible storage medium as recited in claim 40, wherein, in said publishing the advertisement on the network, the program instructions are further computer-executable to implement the node publishing the advertisement within a user-defined domain in a peer-to-peer networking environment on the network.

47. The computer-accessible storage medium as recited in claim 46, wherein the user-defined domain is a peer group.

48. The computer-accessible storage medium as recited in claim 40, wherein the resource is a device in the networking environment.

49. The computer-accessible storage medium as recited in claim 40, wherein the resource is a service implemented on another node in the networking environment.

50. The computer-accessible storage medium as recited in claim 40, wherein the advertisement includes metadata describing the resource, wherein the metadata includes one or more of global positioning information, a unique identifier, a name, a description, a type, and a pipe identifier for the resource.

51. A computer-accessible storage medium storing program instructions, wherein the program instructions are computer-executable to implement:
   one or more peer nodes in a peer-to-peer networking environment on a network discovering one or more network resources using one or more protocols supported by the network resources;
   the one or more peer nodes obtaining a description for each of the discovered network resources, wherein each description is formatted according to one of the one or more protocols supported by the associated network resource;
   the one or more peer nodes translating the descriptions to generate advertisements in a format that provides a uniform representation of associated network resources in the peer-to-peer networking environment; and
   the one or more peer nodes publishing the advertisements in the peer-to-peer networking environment for discovery by entities on the network;
   in response to discovery by an entity on the network of one of the advertisements associated with one of the network resources:
      the one or more peer nodes translating the discovered advertisement to generate a description for the associated network resource in a different format used by the entity;
      the one or more peer nodes establishing according to information in the description of the network resource, a tunnel socket on the network between the network resource and the entity, wherein the tunnel socket provides a multiplexed communications channel, wherein the tunnel socket is configured to enable communications between the entity and the network resource in accordance with the description of the network resource;
   the tunnel socket translating messages sent to the network resource by the entity into a protocol used by the network resource; and
   the tunnel socket translating messages sent by the network resource to the entity into a different protocol used by the entity.

52. The computer-accessible storage medium as recited in claim 51, wherein, to the entity, the network resource associated with the description in the different format used by the entity appears as a resource in a local networking environment of the entity.

53. The computer-accessible storage medium as recited in claim 51, wherein the network resources include one or more network devices on the network and one or more network services implemented on nodes on the network.

54. The computer-accessible storage medium as recited in claim 53, wherein the network devices include heterogeneous network devices in different networking environments, and wherein the network services include heterogeneous network services in different networking environments.

55. The computer-accessible storage medium as recited in claim 54, wherein the networking environments differ in one or more of underlying platforms and protocols supported by networking devices and networking services in the networking environments.

56. The computer-accessible storage medium as recited in claim 51, wherein the peer-to-peer networking environment is implemented according to a peer-to-peer platform.

57. The computer-accessible storage medium as recited in claim 56, wherein the peer-to-peer platform is JXTA.

58. The computer-accessible storage medium as recited in claim 51, wherein each advertisement includes metadata describing an associated network resource, wherein the metadata includes one or more of global positioning information, a unique identifier, a name, a description, a type, and a pipe identifier for the associated network resource.

* * * * *